US011163111B2

United States Patent
Zediker et al.

(10) Patent No.: US 11,163,111 B2
(45) Date of Patent: *Nov. 2, 2021

(54) MULTI-CLAD OPTICAL FIBER

(71) Applicant: Nuburu, Inc., Centennial, CO (US)

(72) Inventors: Mark S. Zediker, Castle Rock, CO (US); Robert A. Stegeman, Denver, CO (US); James P. Tucker, Centennial, CO (US); Jean-Philippe Feve, Monument, CO (US)

(73) Assignee: Nuburu, Inc., Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,556

(22) Filed: Apr. 27, 2020

(65) Prior Publication Data

US 2021/0048578 A1    Feb. 18, 2021

Related U.S. Application Data

(63) Continuation of application No. 15/959,128, filed on Apr. 20, 2018, now Pat. No. 10,634,842.

(Continued)

(51) Int. Cl.
*G02B 6/036* (2006.01)
*G02B 6/028* (2006.01)
(Continued)

(52) U.S. Cl.
CPC ......... *G02B 6/028* (2013.01); *G02B 6/03605* (2013.01); *G02B 6/03683* (2013.01);
(Continued)

(58) Field of Classification Search
CPC .... G02B 6/028; G02B 6/262; G02B 6/03605; H01S 3/06708
See application file for complete search history.

(56) References Cited

U.S. PATENT DOCUMENTS 3,806,224 A    4/1974  MacChesney
6,614,974 B2   9/2003  Elrefaie
(Continued)

FOREIGN PATENT DOCUMENTS

CN    104160310    11/2001
CN    10212485     7/2011
(Continued)

OTHER PUBLICATIONS

Mar. 26, 2020, EPO, Examination Report EP 18787744.4.

*Primary Examiner* — Ellen E Kim
(74) *Attorney, Agent, or Firm* — Glen P. Belvis; Belvis Law, LLC.

(57) ABSTRACT

A multi-clad optical fiber design is described in order to provide low optical loss, a high numerical aperture (NA), and high optical gain for the fundamental propagating mode, the linearly polarized (LP) 01 mode in the UV and visible portion of the optical spectrum. The optical fiber design may contain dopants in order to simultaneously increase the optical gain in the core region while avoiding additional losses during the fiber fabrication process. The optical fiber design may incorporate rare-earth dopants for efficient lasing. Additionally, the modal characteristics of the propagating modes in the optical core promote highly efficient nonlinear mixing, providing for a high beam quality ($M^2 < 1.5$) output of the emitted light.

18 Claims, 1 Drawing Sheet

Related U.S. Application Data

(60) Provisional application No. 62/488,440, filed on Apr. 21, 2017.

(51) Int. Cl.
*G02B 6/26* (2006.01)
*H01S 3/067* (2006.01)

(52) U.S. Cl.
CPC .......... *G02B 6/262* (2013.01); *H01S 3/06708* (2013.01); *G02B 6/0281* (2013.01)

(56) References Cited

U.S. PATENT DOCUMENTS

| | | | | |
|---|---|---|---|---|
| 2007/0041083 A1* | 2/2007 | Di Teodoro | ....... | G02B 6/02347 359/333 |
| 2007/0104431 A1* | 5/2007 | Di Teodoro | ........ | H01S 3/06754 385/123 |
| 2011/0305251 A1* | 12/2011 | Tanigawa | ........... | G02B 6/03638 372/6 |

FOREIGN PATENT DOCUMENTS

| | | |
|---|---|---|
| WO | WO 2010/019222 | 2/2010 |
| WO | WO 2013/066964 | 5/2013 |
| WO | WO 2013/170254 | 11/2013 |

\* cited by examiner

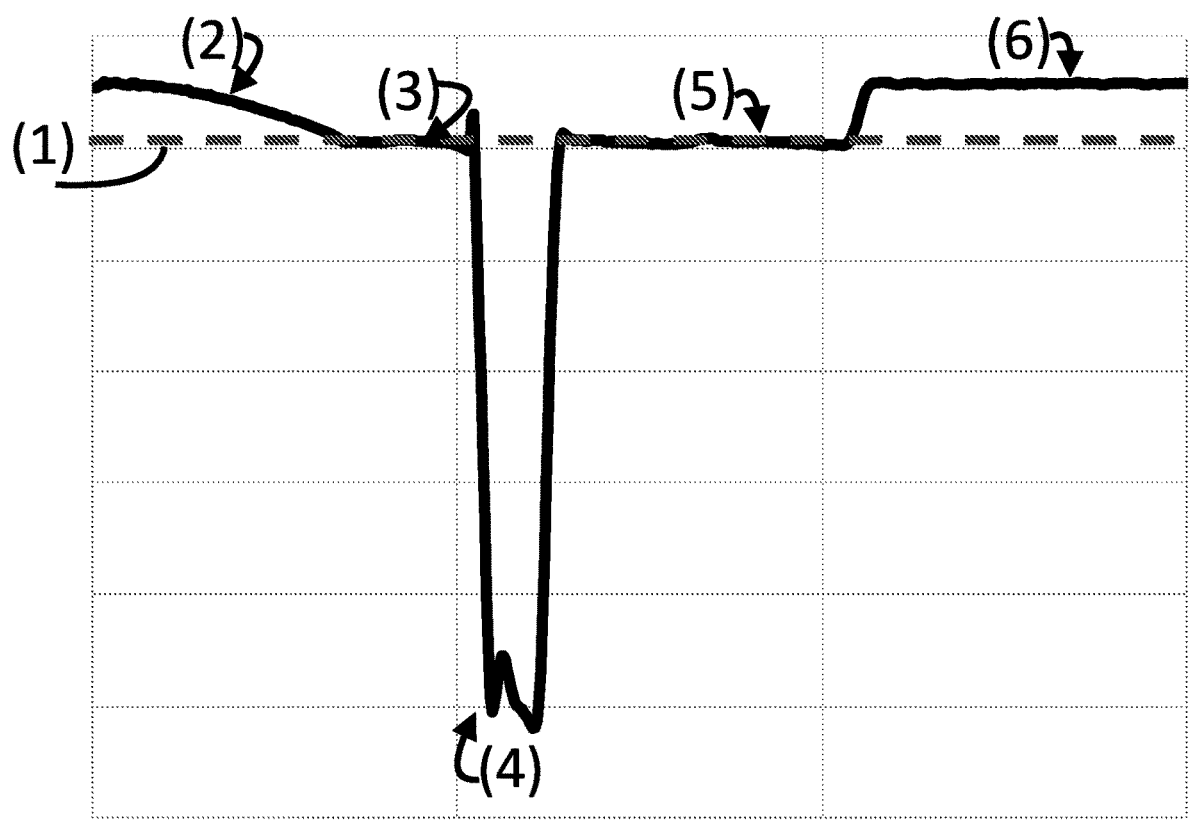

MULTI-CLAD OPTICAL FIBER

This application is a continuation of U.S. patent application Ser. No. 15/959,128, filed Apr. 20, 2018, which claims under 35 U.S.C. § 119(e)(1) the benefit of the filing date of U.S. provisional application Ser. No. 62/488,440 filed Apr. 21, 2017, the entire disclosures of each of which are incorporated herein by reference.

BACKGROUND OF THE INVENTION

Field of the Invention

Embodiments of the present invention relates generally to optical fibers, and more particularly, to multi-clad, high power optical fibers with a high numerical aperture for incoming light, and a high beam quality factor for the output light that operate in the visible regime.

Discussion of Background Arts

Optical fibers have the potential to transform low beam quality (e.g., $M^2 \gg 1.5$) input light to high beam quality (e.g., $M^2 < 1.5$) output light, among other functions. However, it is believed that this potential has essentially only been realized in the IR (infrared) spectrum of light; and then only in the 900 nm to 2000 nm range.

It is believed that prior approaches for multi-clad optical fibers for the transformation of low beam quality, laser diode light into high beam quality light have several failings, including among other things, a failure to provide or suggest light output in the visible regime.

It is believed that prior approaches for converting low beam quality light to high beam quality light in multi-clad optical fibers have several failings, among other things, they fail to address the use of non-solarizing fiber materials for efficient nonlinear conversion of visible, and for example blue, light.

Thus, it is believed that prior to the present inventions fiber configuration having, among other features, a multi-clad structure for high power operation, laser diode pumping of the optical fiber, and mode-conversion processes utilizing rare-earth doped ions or stimulated Raman scattering, and the other features and properties of the present inventions have never been achieved.

Due to the long interaction lengths of optical fibers, low propagation loss is desired for high efficiency. Low propagation loss is critical when using the third order nonlinear tensor elements, specifically the Raman tensor elements, in optical glass. Chemically and mechanically stable glass compositions have been disclosed which claim low optical loss and wider transparency windows than pure fused silica. However, it is believed that all chemically and mechanically stable glass compositions reported to date have higher optical loss than pure fused silica in the visible and UV portion of the optical spectrum. Thus, it is believed that these prior compositions have failed to meet the long standing need for low propagation loss, and in particular, for silica alternatives having lower propagation losses than silica for visible and UV light.

In order to make an optical fiber which guides light in the core via total internal reflection, the index of refraction of the core must be greater than that of the surrounding cladding region. In the visible and UV portion of the spectrum, the use of aluminum in a silica core having a silica clad is known, however this approach has several failings, among other failings, it is believed that this approach has the adverse effect of increasing propagation losses in the visible and UV portion of the spectrum.

Another method to further reduce optical loss in fused silica optical fibers is to introduce excess hydrogen atoms into the pure fused silica glass matrix to lower losses in the visible and UV portions of the optical spectrum. This approach has several failings, among other failings, it is believed that this approach cannot improve the optical propagation losses of blue light when the fused silica glass is doped with other materials, such as aluminum or phosphorous.

As used herein, unless expressly stated otherwise, "UV", "ultra violet", "UV spectrum", and "UV portion of the spectrum" and similar terms, should be given their broadest meaning, and would include light in the wavelengths of from about 10 nm to about 400 nm, and from 10 nm to 400 nm.

As used herein, unless expressly stated otherwise, the terms "visible", "visible spectrum", and "visible portion of the spectrum" and similar terms, should be given their broadest meaning, and would include light in the wavelengths of from about 380 nm to about 750 nm, and 400 nm to 700 nm.

As used herein, unless expressly stated otherwise, the terms "blue laser beams", "blue lasers" and "blue" should be given their broadest meaning, and in general refer to systems that provide laser beams, laser beams, laser sources, e.g., lasers and diodes lasers, that provide, e.g., propagate, a laser beam, or light having a wavelength from about 400 nm to about 500 nm.

As used herein, unless expressly stated otherwise, the terms "green laser beams", "green lasers" and "green" should be given their broadest meaning, and in general refer to systems that provide laser beams, laser beams, laser sources, e.g., lasers and diodes lasers, that provide, e.g., propagate, a laser beam, or light having a wavelength from about 500 nm to about 575 nm.

Generally, the term "about" as used herein, unless specified otherwise, is meant to encompass a variance or range of ±10%, the experimental or instrument error associated with obtaining the stated value, and preferably the larger of these.

This Background of the Invention section is intended to introduce various aspects of the art, which may be associated with embodiments of the present inventions. Thus, the forgoing discussion in this section provides a framework for better understanding the present inventions, and is not to be viewed as an admission of prior art.

SUMMARY

Thus, there has been a long standing and unfulfilled need for low loss, high power, multi-clad, high beam quality optical fibers for visible light; including and in particular, for blue, blue-green and green wavelengths. The present inventions, among other things, solve these needs by providing the articles of manufacture, devices and processes taught, and disclosed herein.

Thus, there is provided a multi-clad, fused silica-based optical fiber which operates at high power in the visible, and specifically blue, portion of the optical spectrum for converting low brightness, high power light from blue laser diodes to high power, high brightness blue light from the output of the optical fiber.

There is provide a fiber and methods of using the fiber to convert a laser beam in one, or more, or all of the visible, UV, and blue wavelengths, to higher beam quality and lower propagation losses, the fused silica based, multi-clad optical fiber having: a core surrounded by a first cladding layer, whereby the optical fiber has a high NA; whereby the fiber is configured to convert low beam quality visible or UV light, having an $M^2 \gg 1.5$, to high beam quality light, having an $M^2 < 1.5$; a hydrogen dopant, whereby the fiber is configured to provide low propagation losses in the visible or UV portions of the optical spectrum; and, the core having a GRIN structure.

Additionally, there is provided these fibers and methods having one or more of the following features: wherein the GRIN structure has components selected from the group consisting of modifiers to the silica glass to alter the refractive index, structures comprised of the silica glass to alter the effective refractive index, and modifiers to the silica glass to shield the core from UV radiation; wherein the first cladding is surround by a second and the second cladding is surround by an outer cladding, wherein each of the claddings has fused silica glass; wherein the first cladding is surround by a second and the second cladding is surround by an outer cladding, wherein each of the claddings has fused silica glass with chemical modifiers; wherein the low beam quality light is converted to the high beam quality light through direct lasing of rare-earth ions; wherein the low beam quality light is converted to the high beam quality light through energy exchange processes induced by nonlinear optics; wherein the optical propagation losses are low in both the visible and UV portion of the spectrum; wherein the GRIN structure has components selected from the group consisting of phosphorous, aluminum, and aluminum and phosphorous; wherein the GRIN structure has components selected from the group consisting of a material that increases the refractive index of pure fused silica and does not solarize when irradiated by blue light; configured to exhibits the highest nonlinear gain to the fundamental mode of the fiber, the LP01 mode; having a second cladding layer surrounding the first cladding layer, wherein the second cladding layer has an effective refractive index which is lower than the first cladding layer refractive index; wherein the second cladding layer has modifiers to the glass matrix thereby lowering the refractive index of the second cladding layer to less than the index of refraction for the first cladding layer; wherein the second cladding layer has a non-solid structure thereby lowering the refractive index of the second cladding layer to less than the index of refraction for the first cladding layer; wherein the second cladding layer has a low index polymer thereby lowering the refractive index of the second cladding layer to less than the index of refraction for the first cladding layer; having a third cladding layer and second cladding layer, wherein the effective index of the third cladding layer is higher than the effective index of the second cladding layer; having a third cladding layer, wherein the effective index of the third cladding layer is higher than the effective index of the second cladding layer; comprising a third cladding layer, wherein the effective index of the third cladding layer is lower than the effective index of the second cladding layer; and, wherein one or more of the first cladding layer, the second cladding layer, and the third cladding layer has a chemical modifier to protect the first claddings and core from UV irradiation.

Further there is provide a fiber and methods of using the fiber to convert a laser beam in one, or more, or all of the visible, UV, and blue wavelengths, to higher beam quality and lower propagation losses, the fused silica based, multi-clad optical fiber which contains the following: one or more cladding layers to produce a high NA; the ability to convert low beam quality light ($M^2 \gg 1.5$) to high beam quality light ($M^2 < 1.5$); low propagation losses in the visible and UV portions of the optical spectrum through hydrogen doping; a graded index (GRIN) structure in the optical core; modifiers to the silica glass to alter the refractive index; structures comprised of the silica glass to alter the effective refractive index; modifiers to the silica glass to shield the core from UV radiation.

Additionally, there is provided these fibers and methods having one or more of the following features: which contains an optical core, an inner cladding, and $2^{nd}$ inner cladding, and an outer cladding, all based on fused silica glass or fused silica glass with chemical modifiers; which converts low beam quality light ($M^2 \gg 1.5$) to high beam quality light ($M^2 < 1.5$) through direct lasing of rare-earth ions; which converts low beam quality light ($M^2 \gg 1.5$) to high beam quality light ($M^2 < 1.5$) through energy exchange processes induced by nonlinear optics; which contains low optical propagation losses in the UV and visible portion of the spectrum due to hydrogen doping of the silica-based glass; which contains a graded index (GRIN) structure in the optical core by the additional of modifiers to the glass matrix; which contains a graded index (GRIN) structure in the optical core by the addition of phosphorous, aluminum, or some combination of aluminum and phosphorous; wherein the modifier is any element or molecule which increases the refractive index of pure fused silica and does not solarize when irradiated by blue light; which exhibits the highest nonlinear gain to the fundamental mode of the fiber, the LP01 mode; which contains a $2^{nd}$ cladding layer with an effective refractive index which is lower than the inner cladding refractive index; which uses chemical modifiers to the glass matrix to lower the refractive index of the $2^{nd}$ cladding layer; which uses a non-solid structure to lower the refractive index of the $2^{nd}$ cladding layer; which uses a low index polymer to lower the refractive index of the second cladding layer; which contains a $3^{rd}$ cladding layer with an effective index higher than the $2^{nd}$ cladding layer; and, which contains chemical modifiers to protect the inner claddings and core of the optical fiber from UV irradiation.

BRIEF DESCRIPTION OF THE DRAWINGS

FIG. 1 is a graph of an embodiment of an index profile for an optical fiber in accordance with the present inventions.

DESCRIPTION OF THE PREFERRED EMBODIMENTS

Embodiments of the present inventions relate to optical fibers having low propagation losses, multi-clad fibers, and configurations of optical fibers for high power and high brightness light.

An embodiment of the present invention is a multi-clad optical fiber. The multi-clad optical fiber contains several advancements in order to produce high power, high brightness light from high power, low brightness light in the visible portion of the optical spectrum. Thus, this embodiment contains multiple cladding layers, e.g., 2, 3, 4, 5 or more, in order to accept incoming light confined to high NA (e.g., 0.2>NA>0.8) and convert it to light exiting the fiber in a low NA (e.g., 0.02<NA<0.1). The core is made of pure fused silica combined with a graded-index structure made of phosphorous and/or aluminum and the cladding layers can be made from, for example, pure fused silica, fluorine-doped fused silica, fluorine-germanium-doped pure fused silica, or a photonic crystal structure made from pure fused silica.

The following table lists the relative indices of refraction for one embodiment of the optical fiber.

| Region in fiber | Relative refractive index* |
| --- | --- |
| GRIN core | $2.5 \times 10^{-3} >$ $\Delta n > 0$ (parabolic) |
| Inner cladding | 0 |
| Middle cladding | $-2.5 \times 10^{-2}$ |
| Outer cladding | 0 |
| Polymer jacket | $2.5 \times 10^{-3}$ |

*relative to fused silica at operating wavelength

In an embodiment the multi-clad configuration the core material is a fused silica-based matrix combined with a graded-index structure made of phosphorous and/or aluminum that is modified through hydrogen doping of the glass, which decreases the propagation losses in the visible and UV portions of the optical spectrum.

In an embodiment to provide small effective areas for the conversion of low brightness light to high brightness light, the center, or inner portion, of the optical fiber is a graded index ("GRIN") structure. The GRIN structure is fabricated by the addition of dopants to the inner cladding structure, thus only the innermost cladding layer can be doped for a circularly symmetric fiber. The dopant can be any non-solarizing, chemically and mechanically stable material element which does not dramatically increases the optical loss, preferably phosphorous, or aluminum, or both. In this manner the GRIN structure forms the optical core of the fiber.

The high NA to accept incoming light is produced by additional dopants, and/or a silica-based structure, to lower the effective refractive index in a region surrounding the inner cladding region. The light may also be confined by a low index coating such as a low index polymer on the outside of the fiber.

The following table lists the dopant concentrations and sizes of the preferred embodiment of the disclosed optical fiber.

| Region in fiber | Dopant/Concentration (mol %) | Region radius* (μm) |
| --- | --- | --- |
| GRIN core | $P_2O_5$/2.5% @ center $H_2$/** | 20 |
| Inner cladding | $H_2$/** | 11.25 |
| Middle cladding | F/12.7% $H_2$/** | 6.25 |
| Outer cladding | *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12

The following table lists the dopant concentration ranges and size ranges of additional embodiments of the disclosed optical fiber.

| Region in fiber | Dopant/Concentration (mol %) | Region radius* (μm) |
| --- | --- | --- |
| GRIN | $P_2O_5$/0.05-30% Al/0.05-30% $H_2$/** | $5 \leq r \leq 40$ |
| Inner cladding | $H_2$/** | $5 \leq r \leq 50$ |
| Middle cladding | F/0.05-25% B/0.05-25% $H_2$/** | $5 \leq r \leq 25$ |
| Outer cladding | *** $H_2$/** | $15 \leq r \leq 100$ |
| Polymer coating | N/A | $10 \leq r \leq 100$ |

*region begins at end of previous region and ends and beginning of next region
**$H_2/O_2$ flame with $H_2$ surplus, preform temperature ~1000° C., 1-20 days duration
*** V (gas flow or gas flows via bubblers):
V—$GeCL_4$/V—$SiCl_4$: 0.2-0.5
V—$SF_6$/V—$SiCl_4$: 0.01-0.3
V—$O_2$sur/V—$SiCl_4$: 0.5-15

The solarization of the dopants in the GRIN optical core is prevented by adding additional dopants to the outer cladding layer. The preferred dopant is germanium, which can be combined with fluorine for less index of refraction perturbation in the outer cladding layer. These additional dopants shield the dopants in the core from UV radiation from the environment as well as during the fiber fabrication process.

Multi-clad fibers provide a means of converting high power, low brightness light to high power, high brightness light via direct lasing transition of rare-earth ions or frequency shifting via nonlinear optics. The small mode effective areas (e.g., 200 μm² or less) and long interactions lengths (e.g., 50 meters or less) enables high brightness light to be created efficiently. Attention has been primarily focused on the near infrared portions of the spectrum, where the propagation of optical fibers, semiconductor pump lasers are readily available, and rare-earth ions have the appropriate absorption and emission bands. Additionally, low propagation losses can result in efficient nonlinear optical processes, even with the modest nonlinearities offered by silica-based glasses.

An embodiment of the present invention allows the use of optical fibers in the visible and UV portions of the spectrum to produce high power when converting low brightness light into high brightness light. There are, however, few rare-earth ions with substantial absorption and emission cross-sections, in tandem with long upper state lifetimes, in the visible and UV portions of the spectrum, thus, generally teaching away from efficient operation using nonlinear optics remains. Advantageously, most nonlinearities increase a function of $1/\lambda$, where $\lambda$ is the wavelength of the light, according to Miller's Rule. Therefore, nonlinear coefficients are higher in the visible and UV portions of the spectrum compared to the near infrared portion of the spectrum. However, losses due to Rayleigh scattering increase as $1/\lambda^4$, such that the optical losses soon prevent efficient nonlinear optics from occurring. Additionally, the tail edge of the electronic absorption band edge of many materials extends from the UV to the visible portion of the spectrum.

An embodiment of the invention includes the combination of decreasing optical losses in the UV and visible portions of the spectrum, in conjunction with a multi-clad fiber design to increase the effective nonlinearity of the optical fiber. The result is an efficient means to convert low brightness light into high brightness light in the visible portion of the spectrum in an optical fiber.

Optical fibers for the transmission of and conversion of low beam quality light ($M^2 >> 1.5$) to high beam quality light ($M^2 < 1.5$). The low quality laser beams that are converted by the present systems, and in particular low quality blue, green and blue green laser beams can have $M^2$ from about 1.55 to about 10, from about 2 to about 5, from about 1.6 to about 15, and greater values as well as all values within these ranges. The high quality laser beams that are provided by the conversion of these low quality laser beams, including the low quality blue laser beams can have $M^2$ from about 1.5 to about 1.1, less than 1.5, less than 1.4, less than 1.3, theoretically 1, and all values within these ranges. Additionally, the $M^2$ values of the converted laser beams provided by embodiments of the present systems can have improved $M^2$ values of at least about 20%, at least about 30%, at least about 40%, at least about 50%, and from about 5% to about 50% over the M2 values of the starting or low quality laser beams.

Embodiments of the present optical fibers, in particular for blue, blue-green and green wavelengths, that have NA of from about 0.1 to 0.8, from about 0.2 to about 0.8, equal to or greater than about 0.22, equal to or greater than 0.25, about 0.22, about 0.3, about 0.4 to about 0.5, about 0.5 to about 0.8 and greater and smaller NAs, as well as all values within these ranges. High NA as used herein are NAs within this range that are greater than 0.22.

Embodiments of the optical fibers provide low propagation losses, in particular for blue, blue-green and green wavelengths, that are from about 10 dB/km to about 40 dB/km, about 10 dB/km to about 30 dB/km, about 20 dB/km to about 40 dB/km, greater than about 15 dB/km, greater than about 10 dB/km, and greater and smaller values, as well as all values within these ranges.

Turning to FIG. 1 there is a chart showing an embodiment of the relative refractive index profile from the center of the core to the outer radius of an embodiment of an optical fiber. In this embodiment, the refractive index profile exhibits radial symmetry of the disclosed optical fiber. The dashed line represents the refractive index of pure fused silica for the intended wavelength or operation. Values higher than the dashed line represent refractive indices which are higher than the refractive index of pure fused silica at the intended wavelength of operation. Values lower than the dashed line represent refractive indices which are lower than the refractive index of pure fused silica at the intended wavelength of operation.

In this embodiment, the fiber has a core radius of 20 μm, a 1st clad thickness of 11.25 μm, a $2^{nd}$ clad thickness of 6.25 μm and a $3^{rd}$ (and outer) clad thickness of 25 μm and an outer coating made up of polyimide or acrylate and having a thickness of 60 μm. The baseline refractive index of pure fused silica is shown by the dotted line 1 at the wavelength of operation. Starting from the center of the core of the optical fiber, the GRIN region 2 is shown with an increased refractive index with respect to inner cladding region 3. The $2^{nd}$ cladding region 4 has a depressed refractive index compared to the inner cladding region 3 to create a large numerical aperture. An outer cladding region 5 is the final glass portion of the optical fiber with a refractive index slightly higher than pure fused silica due to the addition of UV absorbing modifiers near the outer edge of the $2^{nd}$ cladding region 4.

The GRIN core 2 of the optical fiber contains modifiers which have a higher refractive index than pure fused silica to create a positive index difference between the GRIN core 2 and inner cladding 3. The positive refractive index acts as a constant lens inside of the fiber, which forces the effective areas of the lower order modes to be smaller. The smaller effective areas lead to greater energy exchange during the irradiance-dependent nonlinear optical processes, such as four wave mixing, stimulated Brillouin scatter, and stimulated Raman scattering. The modifier is selected such that it does not cause additional losses when irradiated by visible light, which precludes elements such as germanium. This restriction allows the use of aluminum and/or phosphorous in a preferred embodiment.

The modifier is also selected such that the nonlinear coefficient to be utilized in the energy exchange process be increased with respect to the inner cladding layer, viz. the electronic contribution to the $X^{(3)}$ tensor for four wave mixing, the vibronic contribution to the $X^{(3)}$ tensor for stimulated Raman scattering, and electrostriction contribution to the $X^{(3)}$ tensor for stimulated Brillouin scattering. In a preferred embodiment, the modifier is chosen to be phosphorous due to its efficient coupling and increasing of the Raman gain curve of pure fused silica.

Types and Amounts of Modifiers

The purpose of the inner cladding (3) and the $2^{nd}$ cladding (4) is to provide the maximum index of refraction difference. A high refractive index difference allows light within a defined cone volume to be coupled to the inner clad of the optical fiber. The NA of the fiber is defined as the sine of the maximum angle of the incident light rays, with respect to the fiber axis, which will be guided into the optical fiber inner cladding. When coupling light into fiber from air, the NA is defined as NA=$(n_{cl,inner}^2 - n_{cl,outer}^2)^{0.5}$, where $n_{cl,inner}$ is the index of refraction of the inner cladding (3) and $n_{cl,outer}$ is the index of refraction of the $2^{nd}$ cladding (4).

Obtaining a high NA necessitates the use of a lower refractive index for the $2^{nd}$ cladding (4) with respect to the inner clad region (3). In order to minimize optical losses, a preferred embodiment for the inner clad region is the use of pure fused silica. Modifiers to the fused silica glass can be used in order to lower the refractive index. In a preferred embodiment, the modifiers are fluorine, boron, or a combination of fluorine or boron in the $2^{nd}$ clad (4).

Another preferred embodiment for the $2^{nd}$ clad region 4 is the use of a photonic crystal fiber (PCF) structure. The PCF structure is designed such that the effective index of refraction of the $2^{nd}$ clad is lower than the inner clad and can be lower than the index of refraction possible by the use of modifiers in the silica glass, such as fluorine, boron, or a combination of fluorine and boron.

The following table lists the relevant parameters and sizes of the PCF structure to be used as the $2^{nd}$ clad region.

| PCF structure parameter | Size (μm) |
| --- | --- |
| Air hole diameter | $0.5 \leq d \leq 5$ |
| Air hole wall thickness | $0.1 \leq t \leq 0.5$ |

Yet another preferred embodiment of the second cladding region 4 is the use of a UV-curable low index polymer. The polymer is chosen with minimum absorption in the blue region, and low refractive index. An example of the proposed fiber is given in the following table:

| Region in fiber | Composition | Region radius* (μm) |
| --- | --- | --- |
| GRIN | $P_2O_5$/0.05-30% Al/0.05-30% $H_2$/** | $5 \leq r \leq 35$ |
| Inner cladding | $H_2$/** | $0 \leq r \leq 10$ |
| Polymer cladding | Low index polymer (n ≤ 1.38 @ 450 nm) | $10 \leq r \leq 50$ |
| Outer jacket | Acrylate | $10 \leq r \leq 100$ |

*region begins at end of previous region and ends and beginning of next region
**$H_2/O_2$ flame with $H_2$ surplus, preform temperature ~1000° C., 1-20 days duration The outer clad 5 is not meant to guide any optical light but provides two functions. First, it protects the visible light from interacting with a mechanically robust outer coating 6 typically placed on the outside of the outer clad. The outer coating 6 can be metallic, organic, or inorganic. Second, the outer clad contains modifiers which absorb UV light from interacting with the inner clads 3, 4 and core 2 of the optical fiber.

Another blue fiber laser embodiment is the configurtion where a light guiding coating on the fiber consists of a low index polymer used to confine the pump light inside the fiber core. An example of such a polymer is the low index polymer LUVANTIX PC373. Such materials permit very high numerical apertures i.e. very steep input cones of light which are subsequently guided by total internal reflection. These polymers have good resistance to optical damage from high power light. High numerical apertures (NA) created with polymer coatings exceed the input angles created by merely doping the cladding glass to create a total internal reflection surface. In preferred embodiments NA fibers created by the use of polymer coating have a NA greater 0.22. In this embodiment, the fiber core may contain the previously described GRIN structure and may or may not have an interior cladding i.e. the exterior coating may serve as the primary or secondary confinement surface for the pump light.

For blue fiber lasers another embodiment is the case where the fiber core is asymmetric with the pump guiding section of the fiber as is the case with a D shaped core or elliptically shaped core. In these cases the purpose of an asymmetric core is to optimize the extraction of the pump modes.

During the fiber fabrication process, the outer coating (6) is applied in liquid form and exposure to UV light hardens the liquid into a solid, forming the mechanical protective layer to the glass optical fiber. The exposure of UV to the modifiers in the core can cause additional loss mechanisms, such as color center defects. Including a modifier, or modifiers, in the outer clad will absorb the UV light during the fiber fabrication process and prohibit the UV light from interacting with the modifiers in the GRIN core and $2^{nd}$ clad, if present. In a preferred embodiment, the modifier in the outer clad is germanium.

In an embodiment a multi-clad optical fiber design is described in order to provide low optical loss, a high numerical aperture (NA), and high optical gain for the fundamental propagating mode, the linearly polarized (LP) 01 mode in the UV and visible portion of the optical spectrum. The optical fiber design may contain dopants in order to simultaneously increase the optical gain in the core region while avoiding additional losses during the fiber fabrication process. The optical fiber design may incorporate rare-earth dopants for efficient lasing. Additionally, the modal characteristics of the propagating modes in the optical core promote highly efficient nonlinear mixing, providing for a high beam quality ($M^2<1.5$) output of the emitted light.

The following table provide ranges of fiber lengths, optical power in, optical power out, beam quality in, and beam quality out.

| Parameter | Units | Ranges |
|---|---|---|
| Input Power | Watts | 5-2000 |
| Output Power | Watts | 0.1-1500 |
| Beam Quality In ($M^2$) | N/A | 3-100 |
| Beam Quality Out ($M^2$) | N/A | 1-2 |

The following examples are provided to illustrate various embodiments of the present laser systems and operations and in particular a blue laser system for welding components, including components in electronic storage devices. These examples are for illustrative purposes and should not be viewed as, and do not otherwise limit the scope of the present inventions.

EXAMPLE 1

| Region in fiber | Composition (mol %) | Region radius* (μm) |
|---|---|---|
| GRIN core | $SiO_2$ base $P_2O_5$/2.5% @ center (parabolic) $H_2$/** | 20 |
| Inner cladding | $SiO_2$ base $H_2$/** | 11.25 |
| Middle cladding | $SiO_2$ base F/12.7% $H_2$/** | 6.25 |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12

EXAMPLE 2

| Region in fiber | Composition (mol %) | Region radius* (μm) |
|---|---|---|
| GRIN core | $SiO_2$ base $P_2O_5$/2.5% @ center (parabolic) $H_2$/** | 20 |
| Inner cladding | $SiO_2$ base $H_2$/** | 11.25 |
| Middle cladding | $SiO_2$ base $H_2$/** | 2.4/0.22 **** |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12
**** PCF region with air hole diameter/wall thickness listed

EXAMPLE 3

| Region in fiber | Composition (mol %) | Region radius* (μm) |
|---|---|---|
| GRIN core | $SiO_2$ base $P_2O_5$/2.5% @ center (parabolic) $H_2$/** | 12.5 |
| Inner cladding | $SiO_2$ base $H_2$/** | 11.25 |

-continued

| Region in fiber | Composition (mol %) | Region radius* (μm) |
|---|---|---|
| Middle cladding | $SiO_2$ base $H_2$/** | 2.4/0.22 **** |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12
**** PCF region with air hole diameter/wall thickness listed

EXAMPLE 4

| Region in fiber | Composition (mol %) | Region radius* (μm) |
|---|---|---|
| GRIN core | $SiO_2$ base $P_2O_5$/2.5% @ center (parabolic) $H_2$/** | 12.5 |
| Inner cladding | $SiO_2$ base $H_2$/** | 7.5 |
| Middle cladding | $SiO_2$ base $H_2$/** | 2.4/0.22 **** |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V$SiCl_4$: 0.359
V—$SF_6$/V—$SiCl_4$: 0.072
V—$O_2$sur/V—$SiCl_4$: 6.12
**** PCF region with air hole diameter/wall thickness listed

EXAMPLE 5

| Region in fiber | Composition (mol %) | Region radius* (μm) |
|---|---|---|
| GRIN core | $SiO_2$ base $P_2O_5$/2.5% @ center (parabolic) $H_2$/** | 30 |
| Inner cladding | $SiO_2$ base $H_2$/** | 20 |
| Middle cladding | $SiO_2$ base F/12.7% $H_2$/** | 6.25 |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12

EXAMPLE 6

| Region in fiber | Composition (mol %) | Region radius* (μm) |
|---|---|---|
| GRIN core | $SiO_2$ base $P_2O_5$/2.5% @ center (parabolic) $H_2$/** | 30 |
| Inner cladding | $SiO_2$ base $H_2$/** | 20 |
| Middle cladding | $SiO_2$ base $H_2$/** | 2.4/0.22 **** |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12
**** PCF region with air hole diameter/wall thickness listed

EXAMPLE 7

| Region in fiber | Composition (mol %) | Region radius* (μm) |
|---|---|---|
| GRIN core | $SiO_2$ base $P_2O_5$/2.5% @ center (parabolic) $H_2$/** | 30 |
| Inner cladding | $SiO_2$ base $H_2$/** | 10 |
| Middle cladding | $SiO_2$ base $H_2$/** | 2.4/0.22 **** |
| Outer cladding | $SiO_2$ base *** $H_2$/** | 25 |
| Polymer coating | N/A | 60 |

*region begins at end of previous region and ends and beginning of next region
**$H_2/O_2$ flame with $H_2$ surplus, preform temperature ~1000° C., 6.2 days duration
*** V (gas flow or gas flows via bubblers):
V—$GeCL_4$/V—$SiCl_4$: 0.359
V—$SF_6$/V—$SiCl_4$: 0.072
V—$O_2$sur/V—$SiCl_4$: 6.12
**** PCF region with air hole diameter/wall thickness listed

EXAMPLE 7A

| Region in fiber | Composition (mol %) | Region radius* (μm) |
|---|---|---|
| GRIN core | $SiO_2$ base $P_2O_5$/2.5% @ center (parabolic) $H_2$/** | 60 |
| Low Index Polymer Coating (light guiding) | Luvantix PC373 | 100 |

**$H_2/O_2$ flame with $H_2$ surplus, preform temperature ~1000° C., 6.2 days duration

EXAMPLE 8

In one preferred embodiment, the inner cladding has a high numerical aperture such that 0.2<NA<0.8.

EXAMPLE 9

In a preferred embodiment, the rare-earth ion is praseodymium. In another preferred embodiment, the rare-earth ion is thulium.

EXAMPLE 10

In a preferred embodiment, the nonlinear optics processes do not require phase-matching, such as stimulated Raman scattering.

EXAMPLE 11

In another embodiment, the nonlinear optics processes require phase-matching, such as four wave mixing, stimulated Brillouin scattering, or harmonic generation.

EXAMPLE 12

In a preferred embodiment, the hydrogen doping of the silica-based glass is performed at the preform fabrication level. This is accomplished by introducing a hydrogen-rich flame to the silica-based during the chemical vapor deposition phase of preform fabrication.

EXAMPLE 13

In a preferred embodiment, the chemical modifiers are fluorine, boron, or some combination of fluorine and boron.

EXAMPLE 14

In a preferred embodiment, the non-solid structure in a photonic crystal structure.

EXAMPLE 15

In a preferred embodiment, the chemical modifier is germanium.

EXAMPLE 16

In another embodiment, the chemical modifier is any element or molecule which absorbs UV light to prevent exposure of the inner claddings and core of the optical fiber to the UV light.

EXAMPLE 17

In another embodiment, the hydrogen doping of the silica glass is performed after the fabrication of the optical fiber. This is accomplished by placing the optical fiber in a hydrogen-rich environment and applying any combination of heat, pressure, or UV radiation to promote hydrogen migration into the silica-based glass matrix.

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afforded the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and with existing equipment or activities which may be modified, in-part, based on the teachings of this specification. Further, the various embodiments set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular FIGURE.

The invention may be embodied in other forms than those specifically disclosed herein without departing from its spirit or essential characteristics. The described embodiments are to be considered in all respects only as illustrative and not restrictive.

What is claimed:

1. A method of converting low beam quality light to high beam quality of light, the method comprising:
    (a) directing a laser beam having a wavelength in the UV and visible wavelength ranges and an $M^2>1.5$ into a fused silica based, multi-clad optical fiber comprising:
        (i) a silica glass;
        (ii) a core surrounded by a first cladding layer, whereby the fused silica based, multi-clad optical fiber has a high NA;
        (iii) the core comprising a GRIN structure; and,
        (iv) a hydrogen dopant;
        (v) whereby the fused silica based, multi-clad optical fiber is configured to provide low propagation losses in the visible or UV portions of the optical spectrum
    (b) converting the laser beam in the multi-clad optical fiber to high beam quality light having an $M^2<1.5$.

2. The method of claim 1, wherein the GRIN structure comprises components selected from the group consisting of modifiers to the silica glass to alter the refractive index, structures comprised of the silica glass to alter the effective refractive index, and modifiers to the silica glass to shield the core from UV radiation.

3. The method of claim 1 or 2, wherein the first cladding is surround by a second and the second cladding is surround by an outer cladding, wherein each of the claddings comprises fused silica glass.

4. The method of claim 1 or 2, wherein the first cladding is surround by a second and the second cladding is surround by an outer cladding, wherein each of the claddings comprises fused silica glass with chemical modifiers.

5. The method of claim 1, wherein the low beam quality light is converted to the high beam quality light through direct lasing of rare-earth ions.

6. The method of claim 1, wherein the low beam quality light is converted to the high beam quality light through energy exchange processes induced by nonlinear optics.

7. The method of claim 1, wherein the optical propagation losses are low in both the visible and UV portion of the spectrum.

8. The method of claim 1, wherein the GRIN structure comprises components selected from the group consisting of phosphorous, aluminum, and aluminum and phosphorous.

9. The method of claim 1, wherein the GRIN structure comprises components selected from the group consisting of a material that increases the refractive index of pure fused silica and does not solarize when irradiated by blue light.

10. The method of claim 9, wherein the fiber is configured to exhibit the highest nonlinear gain to the fundamental mode of the fiber, the LP01 mode.

11. The method of claim 1, comprising a second cladding layer surrounding the first cladding layer, wherein the second cladding layer has an effective refractive index which is lower than the first cladding layer refractive index.

12. The method of claim 11, wherein the second cladding layer comprises modifiers to the glass matrix thereby lowering the refractive index of the second cladding layer to less than the index of refraction for the first cladding layer.

13. The method of claim 11, wherein the second cladding layer comprises a non-solid structure thereby lowering the refractive index of the second cladding layer to less than the index of refraction for the first cladding layer.

14. The method of claim 11, wherein the second cladding layer comprises a low index polymer thereby lowering the refractive index of the second cladding layer to less than the index of refraction for the first cladding layer.

15. The method of claim 1, wherein the optical fiber according to claim 1, comprising a third cladding layer and second cladding layer, wherein the effective index of the third cladding layer is higher than the effective index of the second cladding layer.

16. The method of claim 11, wherein the optical fiber comprising a third cladding layer, wherein the effective index of the third cladding layer is higher than an effective index of the second cladding layer.

17. The methods of claim 11 or 15, wherein one or more of the first cladding layer, the second cladding layer, and the third cladding layer comprises a chemical modifier to protect the first claddings and core from UV irradiation.

18. The method of claim 11, wherein the optical fiber comprises a third cladding layer, wherein the effective index of the third cladding layer is lower than an effective index of the second cladding layer.

* * * * *